United States Patent
Schreiber

(10) Patent No.: US 12,002,130 B2
(45) Date of Patent: Jun. 4, 2024

(54) METHOD FOR ARTIFACT CORRECTION DURING A RECONSTRUCTION OF AT LEAST ONE SLICE IMAGE FROM A PLURALITY OF PROJECTION IMAGES

(71) Applicant: Siemens Healthcare GmbH, Erlangen (DE)

(72) Inventor: Bernd Schreiber, Forchheim (DE)

(73) Assignee: Siemens Healthineers AG, Forchheim (DE)

(*) Notice: Subject to any disclaimer, the term of this patent is extended or adjusted under 35 U.S.C. 154(b) by 303 days.

(21) Appl. No.: 17/411,314

(22) Filed: Aug. 25, 2021

(65) Prior Publication Data
US 2022/0067988 A1  Mar. 3, 2022

(30) Foreign Application Priority Data
Aug. 31, 2020 (DE) ...................... 10 2020 210 958.3

(51) Int. Cl.
*G06T 11/00* (2006.01)
*G06T 7/00* (2017.01)

(52) U.S. Cl.
CPC .......... *G06T 11/008* (2013.01); *G06T 7/0012* (2013.01); *G06T 11/005* (2013.01);
(Continued)

(58) Field of Classification Search
CPC ... G06T 11/008; G06T 7/0012; G06T 11/005; G06T 2207/10081; G06T 2207/30008; G06T 2210/41; G06T 2211/448
See application file for complete search history.

(56) References Cited

U.S. PATENT DOCUMENTS

| | | |
|---|---|---|
| 5,270,925 A | 12/1993 | Stegehuis |
| 6,600,801 B2 | 7/2003 | Raupach |

(Continued)

FOREIGN PATENT DOCUMENTS

| | | |
|---|---|---|
| DE | 68911072 T2 | 5/1994 |
| DE | 102005053498 A1 | 5/2007 |
| DE | 102006046047 A1 | 4/2008 |

OTHER PUBLICATIONS

Zhao et. al., „Multi-materials beam hardening artifacts cor-rection for computed tomography (CT) based on X-ray spectrum estimation, arXiv: 1812.02365v1, 2018.
(Continued)

*Primary Examiner* — Pakee Fang
(74) *Attorney, Agent, or Firm* — Harness, Dickey & Pierce, P.L.C.

(57) ABSTRACT

A computer-implemented method is for artifact correction during a reconstruction of at least one slice image from at least one projection image. The at least one projection image includes a plurality of pixels, each pixel including a pixel value. The method includes determining at least one corrected projection image based on the at least one projection image via a computing circuit; reconstructing the at least one slice image based on the at least one corrected projection image; and providing the at least one slice image. The determining includes determining an average pixel value in at least one subarea of the at least one projection image, a correction value by multiplying the average pixel value by a scatter factor, and a plurality of corrected pixel values by subtracting the correction value from the plurality of pixel values. The corrected projection image includes pixels including the plurality of corrected pixel values.

16 Claims, 7 Drawing Sheets

(52) U.S. Cl.
CPC ............. *G06T 2207/10081* (2013.01); *G06T 2207/30008* (2013.01); *G06T 2210/41* (2013.01)

(56) References Cited

U.S. PATENT DOCUMENTS

| | | | |
|---|---|---|---|
| 7,889,833 B2 * | 2/2011 | Hagiwara | A61B 6/5258 378/4 |
| 2007/0104310 A1 | 5/2007 | Nottling et al. | |
| 2008/0159469 A1 | 7/2008 | Ruhrnschopf et al. | |
| 2016/0078647 A1 * | 3/2016 | Schildkraut | G06T 11/005 382/131 |
| 2018/0336708 A1 * | 11/2018 | Lin | G06T 15/06 |
| 2020/0138386 A1 * | 5/2020 | Zimmerman | A61B 6/482 |

OTHER PUBLICATIONS

Krumm et al., „Beam Hardening Correction of Multi-Material Objects, 10th European Conference of Non-Destructive Tes-ting, 2010 (https://www.ndt.net/article/ecndt2010/reports/1_09_27.pdf).

Zellerhoff M., et al.; "Low Contrast 3D-Reconstruction From C-Arm Data"; Published by Medical Imaging 2005: Physics of Medical Imaging, Proceedings of SPIE vol. 5745; pp. 646-655; Aug. 30, 2005.

German Office Action for German Application No. 10 2020 210 958.3 dated Jun. 2, 2021.

\* cited by examiner

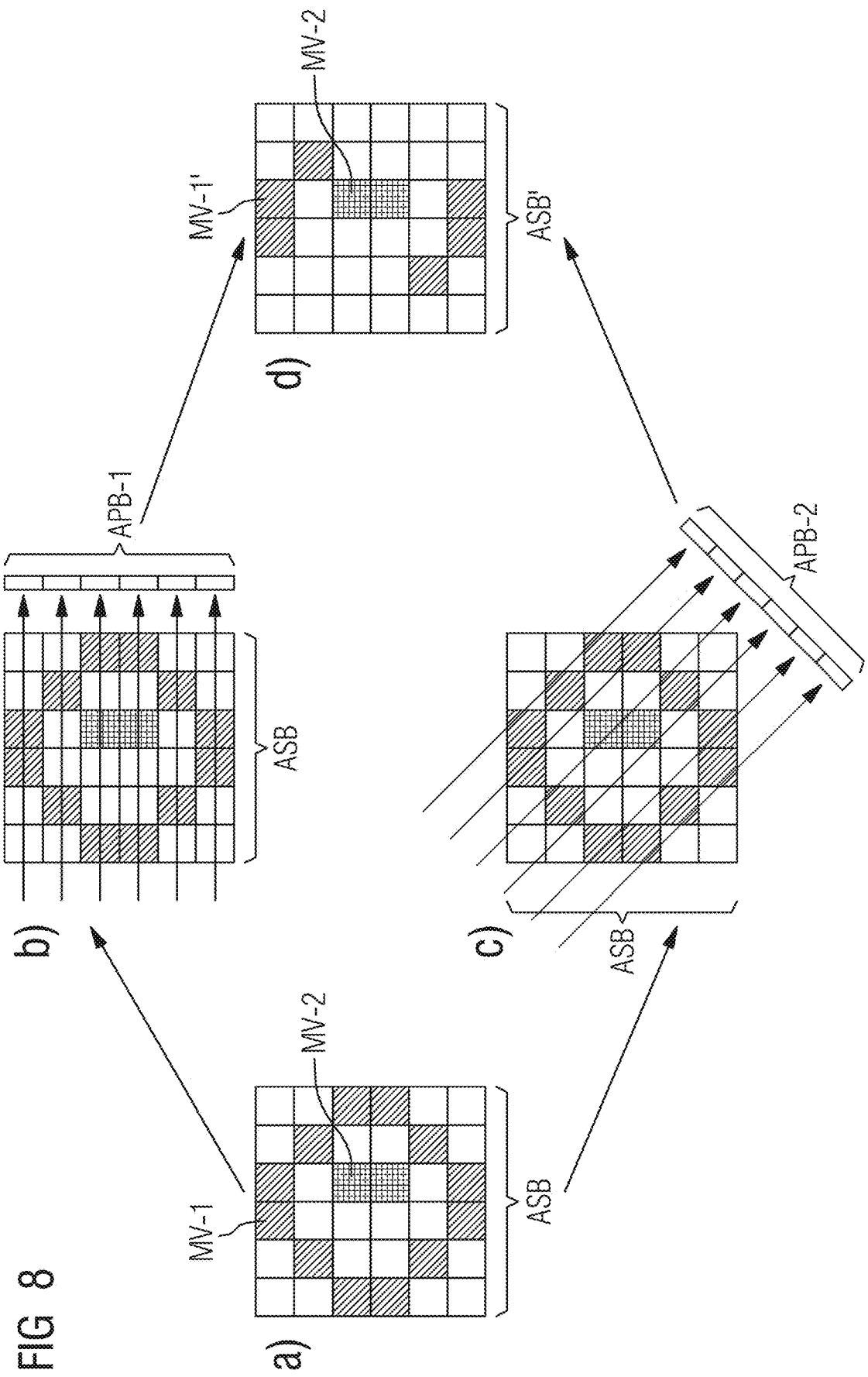

METHOD FOR ARTIFACT CORRECTION DURING A RECONSTRUCTION OF AT LEAST ONE SLICE IMAGE FROM A PLURALITY OF PROJECTION IMAGES

PRIORITY STATEMENT

The present application hereby claims priority under 35 U.S.C. § 119 to German patent application number DE102020210958.3 filed Aug. 31, 2020, the entire contents of which are hereby incorporated herein by reference.

FIELD

Example embodiments of the invention generally relate to a computer-implemented method for artifact correction during a reconstruction of at least one slice image from a plurality of projection images. Example embodiments of the invention further generally relate to a reconstruction system, a computer program product and a computer-readable storage medium.

BACKGROUND

A slice image such as produced in computed tomography imaging (CT imaging), imaging using a C-arm or x-ray tomography imaging is typically determined or reconstructed from a plurality of projection images. In order to generate an individual projection image, an examination subject is typically projected by way of x-ray radiation onto a detector or x-ray detector or radiation detector. During this process the x-ray radiation is typically emitted by an x-ray source or x-ray tube. The examination subject is typically positioned between the x-ray source and the detector. The plurality of projection images are typically produced for a plurality of projection angles. A projection angle describes the angle at which the examination subject is projected onto the detector. The x-ray radiation typically exhibits a polychromatic spectrum.

Typically, when x-rays are passed through the examination subject, the spectrum of the x-ray radiation is hardened. In other words, low-frequency components of the x-ray radiation are attenuated more strongly than higher-frequency components. A mean energy of the spectrum is shifted as a result. This leads to so-called beam hardening artifacts or simply hardening artifacts in the at least one slice image.

In addition, the projection image of the examination subject is overlaid by scattered x-ray radiation or scattered radiation. Typically, the scattered radiation also leads to artifacts in the at least one slice image.

Algorithms for correcting the scattered radiation artifacts and/or the beam hardening artifacts are typically optimized for CT imaging.

Imaging by way of a C-arm system or by way of cone-beam CT is typically used for imaging interventional processes. In other words, medical interventions or operations in particular can be monitored or visualized via C-arm imaging. During such interventions, use is often made of contrast agents, embolization materials, such as e.g. Onyx, and/or metallic objects, such as e.g. catheters or stents. These materials typically absorb more x-ray radiation than tissue and/or bone.

SUMMARY

In particular, the inventors have discovered that the strongly absorbing materials additionally harden the spectrum of the x-ray radiation. Consequently, the strongly absorbing materials generate increased beam hardening artifacts in imaging via C-arm compared to CT imaging. In CT imaging, beam hardening artifacts are typically caused only by bone. A two-component beam hardening correction based on a segmentation of soft tissue and bone is typically performed in order to correct beam hardening artifacts in CT imaging. That the, however, in a beam hardening correction of the type, the strongly absorbing materials still generate beam hardening artifacts.

Furthermore, the inventors have discovered that the strongly absorbing materials lead to an increased scattering of the x-ray radiation. Also, in imaging via C-arm, a flat panel detector is typically used, which has a not insignificant extension of e.g. 30 cm×30 cm in both dimensions. In CT imaging, on the other hand, line detectors with high-precision anti-scatter grids are used. As a result, the scattered radiation artifacts in imaging via C-arm are typically more pronounced than in CT imaging.

At least one embodiment of the present invention provides a method which enables a reconstruction of at least one slice image in the presence of strongly absorbing materials.

Embodiments of the present invention are directed to a method for artifact correction during a reconstruction of at least one slice image from a plurality of projection images; a reconstruction system for performing artifact correction during a reconstruction of at least one slice image from a plurality of projection images; a computer program product; and a computer-readable storage medium. Advantageous developments are recited in the claims and in the following description.

Embodiments are described below both in relation to the devices and in relation to the method. Features, advantages or alternative embodiments mentioned in this context are equally to be applied also to the other subject matters, and vice versa. In other words, the object-related claims (which are directed for example to a device) can also be developed by the features that are described or claimed in connection with a method. The corresponding functional features of the method are in this case embodied by corresponding object-related modules.

At least one embodiment of the invention relates to a computer-implemented method for artifact correction during a reconstruction of at least one slice image from a plurality of projection images. The method comprises providing the plurality of projection images, each projection image of the plurality of projection images comprising a plurality of pixels. Each pixel of the plurality of pixels at the same time comprises a pixel value. The method also comprises determining a plurality of corrected projection images based on the plurality of projection images via a computing circuit, e.g. including at least one processor or a stand alone circuit such as an ASIC. The method further comprises reconstructing the at least one slice image based on the plurality of corrected projection images. The method also comprises providing the at least one slice image.

In at least one embodiment, the determining of the plurality of corrected projection images for each projection image of the plurality of projection images also comprises determining an average pixel value in at least one subarea of the projection image, determining a correction value by multiplying the average pixel value by a scatter factor, and determining a plurality of corrected pixel values by subtracting the correction value from the plurality of pixel values of the projection image. A corrected projection image of the plurality of corrected projection images in this case comprises a plurality of pixels comprising the plurality of corrected pixel values.

At least one embodiment of the invention further relates to a reconstruction system for performing artifact correction during a reconstruction of at least one slice image from a plurality of projection images, the reconstruction system comprising an interface and a computing circuit, including at least one processor, for example. In this case the interface and/or the computing circuit are/is embodied to provide the plurality of projection images.

In this case each projection image of the plurality of projection images comprises a plurality of pixels, each pixel of the plurality of pixels comprising a pixel value. In this case the computing circuit is also embodied to determine a plurality of corrected projection images. In this case the computing circuit is also embodied to reconstruct the at least one slice image based on the plurality of projection images. In this case the interface and/or the computing circuit are/is also embodied to provide the at least one slice image.

The determining of the plurality of corrected projection images for each projection image of the plurality of projection images in this case comprises the computing circuit being embodied to determine an average pixel value in at least one subarea of the projection image, as well as to determine a correction value by multiplying the average pixel value by a scatter factor and as well as to determine a plurality of corrected pixel values by subtracting the correction value from the plurality of pixel values. In this case a corrected projection image of the plurality of corrected projection images comprises a plurality of pixels which comprise the plurality of corrected pixel values.

At least one embodiment of the invention also relates to a computer program product comprising a computer program, as well as to a computer-readable medium. A largely software-based implementation has the advantage that reconstruction systems already used previously in the prior art can also be easily upgraded by way of a software update in order to operate in the manner described. In addition to the computer program, such a computer program product may, where applicable, comprise additional constituent parts such as e.g. a set of documentation and/or additional components, as well as hardware components, such as e.g. hardware keys (dongles, etc.) to enable use of the software.

In particular, at least one embodiment of the invention also relates to a computer program product comprising a computer program which can be loaded directly into a memory of a reconstruction system, and having program sections for carrying out all steps of at least one embodiment of the method for performing artifact correction during a reconstruction of at least one slice image from a plurality of projection images and its aspects when the program sections are executed by the reconstruction system.

In particular, at least one embodiment of the invention relates to a computer-readable storage medium on which are stored program sections that can be read and executed by a determination system in order to carry out all steps of an embodiment of the method for performing artifact correction during a reconstruction of at least one slice image from a plurality of projection images and its aspects when the program sections are executed by the reconstruction system.

At least one embodiment of the invention is directed to to a computer-implemented method for artifact correction during a reconstruction of at least one slice image from a plurality of projection images, comprising:
  providing the plurality of projection images, each projection image of the plurality of projection images including a plurality of pixels and each pixel of the plurality of pixels including a pixel value;
  determining a plurality of corrected projection images based on the plurality of projection images via a computing circuit;
  reconstructing the at least one slice image based on the plurality of corrected projection images; and
  providing the at least one slice image,
  wherein the determining of the plurality of corrected projection images, for each respective projection image of the plurality of projection images, comprises:
    determining an average pixel value in at least one subarea of the respective projection image,
    determining a respective correction value by multiplying the average pixel value by a scatter factor, and
    determining a plurality of corrected pixel values by subtracting the respective correction value from the plurality of pixel values of the respective projection image,
  wherein a respective corrected projection image of the plurality of corrected projection images includes a plurality of pixels including the plurality of corrected pixel values.

At least one embodiment of the invention is directed to to a reconstruction system for performing artifact correction during a reconstruction of at least one slice image from a plurality of projection images, the reconstruction system comprising:
  an interface; and
  a computing circuit, at least one of the interface and the computing circuit being embodied to provide the plurality of projection images, each respective projection image of the plurality of projection images including a plurality of pixels and each respective pixel of the plurality of pixels including a respective pixel value,
  the computing circuit being further embodied to
    determine a plurality of corrected projection images,
    reconstruct the at least one slice image based on the plurality of corrected projection images,
  at least one of the interface and the computing circuit being embodied to provide the at least one slice image,
  wherein to determine the plurality of corrected projection images, the computing circuit is further embodied to, for each respective projection image of the plurality of projection images,
    determine an average pixel value in at least one subarea of the respective projection image,
    determine a respective correction value by multiplying the average pixel value by a scatter factor,
    determine a plurality of corrected pixel values by subtracting the respective correction value from the plurality of pixel values of the projection image,
    wherein a respective corrected projection image of the plurality of corrected projection images includes a plurality of pixels including the plurality of corrected pixel values.

At least one embodiment of the invention is directed to to a non-transitory computer program product storing a computer program, directly loadable into a memory of a reconstruction system, including program sections for performing the method of an embodiment when the program sections are executed by the reconstruction system.

At least one embodiment of the invention is directed to to a non-transitory computer-readable storage storing program sections, readable and executable by a reconstruction system, to perform the method of an embodiment when the program sections are executed by the reconstruction system.

BRIEF DESCRIPTION OF THE DRAWINGS

The above-described characteristics, features and advantages of this invention will become clearer and more readily understandable in connection with the following figures and their descriptions. At the same time, the figures and descriptions are not intended to limit the invention and its embodiments in any way.
Like components are labeled with corresponding reference signs in different figures. The figures are generally not to scale.

In the figures:

FIG. 8 shows a working slice image for determining at least one working projection image.

DETAILED DESCRIPTION OF THE EXAMPLE EMBODIMENTS

Figure 1:
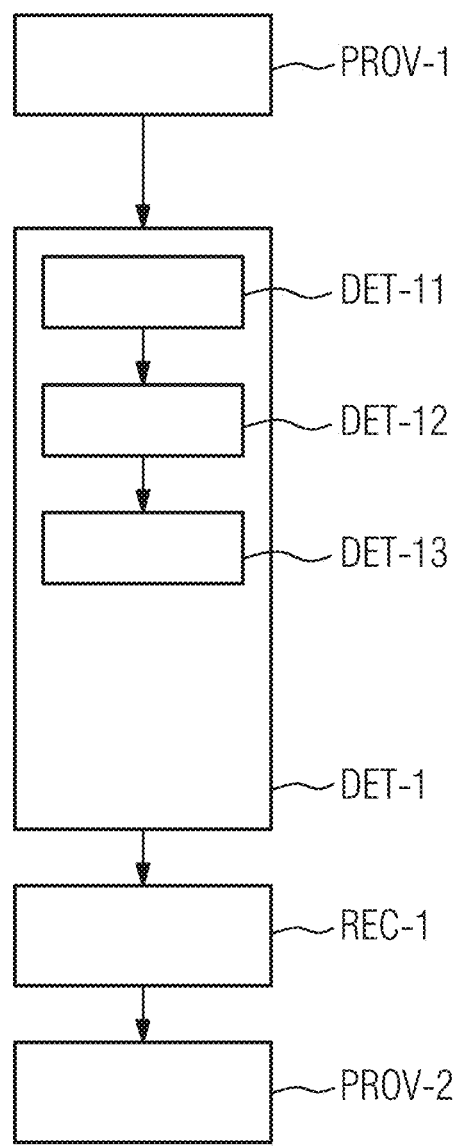
FIG. 1 shows a first example embodiment of a method for performing artifact correction during a reconstruction of at least one slice image from a plurality of projection images.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a computer-implemented method for artifact correction during a reconstruction of at least one slice image from a plurality of projection images. The method comprises providing the plurality of projection images, each projection image of the plurality of projection images comprising a plurality of pixels. Each pixel of the plurality of pixels at the same time comprises a pixel value. The method also comprises determining a plurality of corrected projection images based on the plurality of projection images via a computing circuit, e.g. including at least one processor or a stand alone circuit such as an ASIC. The method further comprises reconstructing the at least one slice image based on the plurality of corrected projection images. The method also comprises providing the at least one slice image.

In at least one embodiment, the determining of the plurality of corrected projection images for each projection image of the plurality of projection images also comprises determining an average pixel value in at least one subarea of the projection image, determining a correction value by multiplying the average pixel value by a scatter factor, and determining a plurality of corrected pixel values by subtracting the correction value from the plurality of pixel values of the projection image. A corrected projection image of the plurality of corrected projection images in this case comprises a plurality of pixels comprising the plurality of corrected pixel values.

The plurality of projection images can be acquired in particular using a medical device. The medical device may be in particular a C-arm device. Alternatively, the medical device may be a cone-beam x-ray machine or a cone-beam computed tomography device. Alternatively, the medical device may be a computed tomography device or an x-ray tomography device.

In particular, in the course of the acquisition of a projection image of the plurality of projection images, x-ray radiation is transmitted through an examination subject or object and the intensity of the x-ray radiation is acquired or recorded or measured or detected or captured behind the examination subject via an x-ray detector or detector. The examination subject may be for example a patient, an animal or an object. In this way, at least a part of the examination subject can be imaged in the projection image.

Advantageously, the plurality of projection images are acquired from different angles or directions or acquisition angles relative to the examination subject. In other words, the plurality of projection images are acquired from a plurality of acquisition angles.

The plurality of acquisition angles describe an angular range. The angular range can comprise a range between 0° and 120° up to a range between 0° and 360°, for example. In particular, the angular range can comprise a range between 0° and 220°. In this case the acquisition angles of two projection images may be pairwise distinct.

In particular, each projection image may be preprocessed. In other words, each projection image may have been preprocessed in a preprocessing step. In particular, the preprocessing step may comprise a standard method for correcting scattered radiation. One such standard method is described for example in Zellerhoff et al. "Low contrast 3D reconstruction from C-arm data", Proceedings of SPIE Vol. 5745, 2005, the entire contents of which are hereby incorporated herein by reference.

In at least one embodiment, the method step of providing the at least one projection image, the plurality of projection images are provided by a database, for example. The database may in this case be an external database. The external database may in particular be resident or stored on a server. Alternatively, the external database may be stored in a cloud system. Alternatively, the database may be an internal database. In particular, the database may be a picture archiving and communication system (PACS). Alternatively, the plurality of projection images may be provided by the medical device.

Each projection image of the plurality of projection images comprises a plurality of pixels. In particular, the projection image comprises more than one pixel. Each pixel of the plurality of pixels comprises a pixel value. The pixel value describes an intensity value. The intensity value is determined by the properties, in particular by the absorption properties, of the examination subject at the location of the corresponding pixel. In particular, each pixel of the plurality of pixels can comprise a pixel value. In particular, the plurality of pixels of each projection image can be arranged in a pixel matrix. The pixel matrix is advantageously two-dimensional. In particular, the pixel values of the pixels arranged in the pixel matrix of each projection image can describe a two-dimensional image or a two-dimensional projection of the examination subject.

In at least one embodiment, in the determining of the plurality of corrected projection images, the plurality of corrected projection images are determined via a computing circuit based on the plurality of projection images.

The determining of the plurality of corrected projection images in this case comprises, for each projection image of the plurality of projection images, the method step of determining an average pixel value in at least one subarea of the projection image. The subarea may in particular comprise the entire projection image. In particular, the subarea may comprise at least one pixel of the projection image. In particular, the subarea may comprise a portion of the plurality of pixels.

In particular, the subarea comprises pixels that represent a continuous section in the pixel matrix. In particular, the pixels of the subarea may be arranged in a square or rectangle. In particular, the subarea may comprise an inner part of the projection image. In other words, the subarea can be arranged spaced at a distance from the edge of the projection image. The subarea can in this case comprise a half or a quarter or an eighth of the plurality of pixels. In particular, the subarea can comprise a ninth of the plurality of pixels. In particular, the average pixel value can be determined by adding all the pixel values of the pixels included in the subarea, the sum total is divided by the number of pixels in the subarea, and the negative result is delogarithmized. Alternatively, the delogarithmizing step can be omitted or the result itself can be delogarithmized. In this case the method step is performed for each projection image of the plurality of projection images. An average pixel value is determined in the process for each projection image.

In at least one embodiment, the method step of determining the plurality of corrected projection images in this case also comprises, for each projection image of the plurality of projection images, the method step of determining the correction value by multiplying the average pixel value of the at least one subarea of the projection image by the scatter factor. The scatter factor in this case describes in particular a strength of the scattering. The scatter factor can in this case be determined in particular empirically and/or by way of a simulation. Alternatively or in addition, the scatter factor can be determined experimentally. Alternatively or in addition, the scatter factor can be determined in an automated manner, for example by use of machine learning and/or deep learning. In particular, the scatter factor can be less than one. In particular, the scatter factor can be 0.075. In particular, the scatter factor can be device-dependent. In other words, the scatter factor can be different for different medical devices. In particular, the correction value can be determined by multiplying the average pixel value by the scatter factor. In particular, the correction value for the projection image is constant. In particular, the correction value can be different for at least two projection images of the plurality of projection images.

In at least one embodiment, the method step of determining the plurality of corrected projection images in this case also comprises, for each projection image of the plurality of projection images, the method step of determining the plurality of corrected pixel values by subtracting the correction value from the plurality of pixel values of the projection image. In other words, the correction value is subtracted from each pixel value of the plurality of pixels of the projection image.

In particular, the correction value can in this case be subtracted from the plurality of delogarithmized pixel values of the projection image if the delogarithm was applied in order to determine the average pixel value. In particular, the correction value can be subtracted from the negative delogarithmized pixel values if the delogarithm of the negative result was determined in order to determine the average pixel value. The delogarithm in this case corresponds to the exponential function. In particular, the plurality of corrected pixel values can then be determined by logarithmizing these differences.

In particular, the negative logarithm of this difference can then be determined in order to determine the plurality of corrected pixel values if the average pixel value was determined by delogarithmizing the negative result. In particular, a corrected projection image then comprises the plurality of pixels that comprise the plurality of corrected pixel values.

In particular, the size in relation to the number and the arrangement of the pixels in the pixel matrix of the corrected projection image is therefore identical to the size of the projection image. In particular, a corrected projection image can therefore be determined for each projection image of the plurality of projection images. In particular, the plurality of corrected projection images can be determined in this way.

In at least one embodiment, the method steps of determining the average pixel value, determining the correction value and determining the plurality of corrected pixel values are performed for each projection image. A corrected projection image is determined in this case for each projection image. The plurality of corrected projection images are therefore determined based on the plurality of projection images. The acquisition angle of a projection image corresponds here in each case to the acquisition angle of a corrected projection image.

In at least one embodiment, in the method step of reconstructing the at least one slice image, the at least one slice image is reconstructed based on the plurality of corrected projection images. For example, the at least one slice image can be reconstructed or calculated from the plurality of corrected projection images by way of a filtered backprojection. In particular, a truncation correction can be carried out during the reconstruction in order to avoid or reduce truncation artifacts.

The at least one slice image is provided in the method step of providing the at least one slice image. In particular, the slice image can be provided in an internal and/or external database. In particular, the at least one slice image can be provided in a PACS. Alternatively or in addition, the slice image can be provided to a user. In particular, the slice image can be displayed. The displaying of the slice image can in this case be realized via a display unit. Alternatively or in addition, providing the at least one slice image can comprise a storing of the at least one slice image. In particular, the at least one slice image can be stored in the internal or external database. Alternatively or in addition, the at least one slice image can be stored on an external storage medium. The external storage medium may be for example a USB stick, a CD, a DVD, an external hard disk drive and/or a memory card.

The inventors have recognized that by determining the plurality of corrected projection images it is possible to reduce scattered radiation artifacts in the at least one slice image. The inventors have also recognized that scattered radiation artifacts that are generated as a result of an increased scattering of the x-ray radiation from strongly absorbing materials can be reduced in this way. The inventors have recognized that in this way it is possible to reduce scattered radiation artifacts in at least one slice image of an examination subject which comprises such a strongly absorbing material. The inventors have recognized that this is of interest in particular in interventional imaging for example via a C-arm. The inventors have recognized that spacing the subarea at a distance from the edge of each projection image prevents edge artifacts from affecting the average pixel value. Edge artifacts of the projection image can be for example an overshooting of the projection image at the edges of the pixel matrix. The inventors have also recognized that the subarea should not be chosen too small so that fluctuations in the pixel values do not have an unduly strong impact on the average pixel value.

According to at least one embodiment of the invention, the method step of determining the plurality of corrected pixel values for each corrected pixel value also comprises the method step of checking whether the corrected pixel value falls below a minimum value, as well as the method step of replacing the corrected pixel value by the minimum value if the corrected pixel value falls below the minimum value.

In particular, these method steps are performed in each corrected projection image for each corrected pixel value of the plurality of corrected pixel values.

In at least one embodiment, in the method step of checking whether the corrected pixel value falls below the minimum value, it is checked whether the corrected pixel value is less than the minimum value. In particular, it is checked whether the delogarithmized corrected pixel value falls below the minimum value if the delogarithm was applied in order to determine the average pixel value. In particular, it is checked whether the delogarithmized negative corrected pixel value falls below the minimum value if the delogarithm was applied to the negative result in order to determine the average pixel value. The minimum value can in particular be a fraction of the correction value. In other words, the minimum value can be the result of a multiplication of the correction value by a safety value. The minimum value can in particular be positive. The safety value can in particular be less than one. The safety value can in particular be 0.5. The safety value can be determined in particular empirically and/or by way of simulation. Alternatively or in addition, the safety value can be determined automatically for example by way of machine learning or deep learning.

In at least one embodiment, in the method step of replacing the corrected pixel value with the minimum value, the corrected pixel value is replaced by the minimum value if the corrected pixel value or the delogarithmized corrected pixel value or the delogarithmized negative corrected pixel value is less than the minimum value. In other words, the corrected pixel value or the delogarithmized corrected pixel value or the delogarithmized negative corrected pixel value is replaced by the minimum value when it is established in the checking method step that the corrected pixel value or the delogarithmized corrected pixel value or the delogarithmized negative corrected pixel value is less than the minimum value. In particular, the corrected pixel value can be replaced by the logarithm of the minimum value if the delogarithm was applied in order to determine the average pixel value. In particular, the corrected pixel value can be replaced by the negative logarithm of the minimum value if the delogarithm was applied to the negative result in order to determine the average pixel value.

The inventors have recognized that in this way it is possible to prevent an overcorrection of the plurality of pixel values of each projection image. In particular, the inventors have recognized that in this way it is possible in particular to prevent a delogarithmized corrected pixel value or a delogarithmized negative corrected pixel value from assuming a negative value. The inventors have recognized that in this way a safeguard can be implemented in the method in order to prevent a corrected pixel value from assuming a non-physical value. Non-physical means that it would not be possible to measure the corrected pixel value in a natural manner in this way.

According to a further advantageous embodiment of the invention, the method further comprises the method step of reconstructing at least one provisional slice image based on the plurality of corrected projection images via the computing circuit. According to the embodiment of the invention, the method also comprises the method step of determining a first material volume within the at least one provisional slice image via the computing circuit. According to the embodiment of the invention, the method also comprises the method step of determining a second material volume within the at least one provisional slice image. According to the embodiment of the invention, the method also comprises the method step of determining a reduced first material volume based on the first and the second material volume. According to the embodiment of the invention, the method also comprises the method step of determining a plurality of reduced projection images based on the reduced first material volume. In this case the method step of reconstructing the at least one slice image is based on the plurality of corrected projection images and the plurality of reduced projection images.

In at least one embodiment, in the method step of reconstructing the at least one provisional slice image, the provisional slice image is reconstructed based on the plurality of corrected projection images. The reconstruction of the at least one provisional slice image can be accomplished in particular by way of filtered backprojection. In other words, the at least one provisional slice image can be reconstructed based on the plurality of corrected projection images by way of filtered backprojection. In particular, a truncation correction can be performed during the reconstruction of the at least one provisional slice image. In particular, a water correction can be performed during the reconstruction. The water correction is a standard method for correcting beam hardening artifacts in homogeneous objects. The method is described for example in Zellerhoff et al. "Low contrast 3D reconstruction from C-arm data", Proceedings of SPIE Vol. 5745, 2005, the entire contents of which are incoprorated herein by reference.

In at least one embodiment, in the method step of determining the first material volume, the first material volume is determined as a subvolume of the at least one provisional slice image. The first material volume in this case comprises in particular the areas in the at least one provisional slice image that represent a first material. In particular, the first material volume can comprise areas in the at least one provisional slice image that represent a first material group. The material group can in this case comprise a first plurality of materials. The first materials of the first plurality of materials in this case exhibit in particular similar absorption properties in relation to the x-ray radiation. In particular, the first material volume may be empty. In other words, the first material volume may comprise no subvolume of the at least one provisional slice image.

In at least one embodiment, in the method step of determining the second material volume, the second material volume is determined as a subvolume of the at least one provisional slice image. The second material volume in this case comprises in particular the areas in the at least one provisional slice image that represent a second material. In particular, the second material volume can comprise areas in the at least one provisional slice image that represent a second material group. The second material group can in this case comprise a second plurality of materials. The materials of the second plurality of materials in this case exhibit in particular similar absorption properties in relation to the x-ray radiation. In particular, the second material volume may be empty. In other words, the second material volume may comprise no subvolume of the at least one provisional slice image.

The first and the second material volume can in particular be disjoint. In other words, the subvolumes of the first and the second material volume then do not overlap. Alternatively, the first and the second material volume may partially overlap or overlay or intersect one another. In other words, a subvolume of the at least one provisional slice image may be included in the first and the second material volume. In particular, an average absorption coefficient of the first material or of the first material group may be less than an average absorption coefficient of the second material or of the second material group. In particular, the second material volume may comprise a subvolume of the at least one provisional slice image which represents strongly absorbing materials such as a metal of a catheter or stent, or a contrast agent or an embolization material, etc.

In at least one embodiment, in the method step of determining the reduced first material volume, the reduced first material volume is determined based on the first and the second material volume. In this case the first material volume of the at least one provisional slice image is reduced or decreased in size based on the second material volume. In other words, the reduced first material volume comprises a subvolume of the first material volume. In particular, the reduced first material volume may comprise the entire first material volume. In particular, the reduced first material volume may be empty.

In at least one embodiment, in the method step of determining a plurality of reduced projection images, the plurality of reduced projection images are determined based on the reduced first material volume. In particular, a reduced projection image can be determined by way of forward projection of a slice image in which the reduced first material volume is segmented. In particular, the forward projection of a projection image is performed from an acquisition angle. In particular, the plurality of reduced projection images can be determined for the plurality of acquisition angles. In this case each reduced projection image can comprise a plurality of pixels. In this case the plurality of pixels can be arranged in a pixel matrix.

In particular, each pixel of each reduced projection image can comprise a reduced pixel value. In particular, the size of a reduced projection image can be identical to the size of a projection image from the plurality of projection images. In other words, a reduced projection image can comprise exactly the same number of pixels as a projection image from the plurality of projection images.

In particular, the pixel matrix of the at least one reduced projection image can be identical in its two-dimensional extension to the pixel matrix of a projection image of the plurality of projection images. In particular, the plurality of reduced projection images can be determined as a plurality of monochromatic projection images of the reduced first material volume. In other words, it can be assumed that an average absorption coefficient of the material included in the reduced first material volume or of the first material group for monochromatic x-ray radiation of a specific energy is known.

In particular, the plurality of monochromatic projection images of the reduced first material volume can then be determined for the plurality of acquisition angles by way of forward projection. In other words, the plurality of monochromatic projection images can be determined for the plurality of acquisition angles by way of forward projection from the slice image in which the reduced first material volume is segmented. In particular, the plurality of monochromatic projection images of the reduced first material volume can correspond to the plurality of reduced projection images. In particular, a reduced pixel value of a reduced projection image can then describe which intensity value of the monochromatic x-ray radiation would be measured in the corresponding pixel if an examination subject that comprises only the reduced first material volume is exposed to the monochromatic x-ray radiation.

The at least one slice image is determined as described above based on the plurality of corrected projection images and the plurality of reduced projection images. In particular, a two-component beam hardening correction is performed in this case. Standard methods for two-component beam hardening correction are described for example in Zhao et al., "Multi-materials beam hardening artifacts correction for computed tomography (CT) based on X-ray spectrum estimation", arXiv: 1812.02365v1, 2018, or Krumm et al., "Beam Hardening Correction of Multi-Material Objects", 10th European Conference of Non-Destructive Testing, 2010 (https://www.ndt.net/article/ecndt2010/reports/1_09_27.pdf), the entire contents of each of which are incorprorated herein by reference. In particular, a reduced projection image corresponds in each case to a forward-projected segmented slice image in this instance.

The inventors have recognized that with the standard methods for two-component beam hardening correction it is not possible to correct beam hardening artifacts caused by strongly absorbing materials such as are routinely used in medical interventions (e.g. metal of a catheter or a stent, contrast agent, embolization materials). The inventors have recognized that by reducing the first material volume based on the second material volume it is possible to reduce or remove beam hardening artifacts caused by strongly absorbing materials in the at least one slice image. The inventors have also recognized that standard algorithms or methods for two-component beam hardening correction can be applied based on the reduced first material volume and the plurality of corrected projection images.

According to a further embodiment of the invention, the at least one provisional slice image comprises a plurality of voxels. In this case the first material volume comprises a bone volume. In this case the bone volume comprises those voxels of the at least one provisional slice image that represent bone. In this case the second material volume comprises those voxels of the at least one provisional slice image that represent a material which has a greater absorption coefficient than bone.

In particular, the voxels are arranged in a voxel matrix. In particular, the voxel matrix can be extended in two dimensions. In particular, the slice image thus represents a disk or layer of the examination subject perpendicularly onto each projection image. In particular, a thickness of the layer corresponds to an edge length of the voxels. In particular, each voxel represents a part of the examination subject. The first material volume in this case comprises those voxels that represent a bone of the examination subject. In this case the first material volume may comprise none, one or a plurality of voxels. In particular, the first material volume can comprise all voxels of the at least one provisional slice image. In particular, the voxels of the first material volume can be arranged continuously in the voxel matrix. Alternatively, the voxels of the first material volume can be arranged in clusters or be arbitrarily distributed in the voxel matrix. The second material volume comprises in particular those voxels that represent a material or a material group whose absorption coefficient is greater than that of bone. In this case the absorption coefficient relates to the average absorption coefficient for the spectrum of the x-ray radiation. In other words, the second material volume comprises those voxels that represent a strongly absorbing material as described above.

The inventors have recognized that the first and the second material volume can be determined based on the voxels. The inventors have also recognized that the absorption coefficient is suitable as a distinguishing feature for determining the first and the second material volume.

According to a further embodiment of the invention, the method steps of determining the first material volume and the second material volume comprise an application of a segmentation algorithm'.

In particular, the first and the second material volume can be determined by use of the segmentation algorithm' based on the absorption coefficients of the first or the second material or of the first or the second material group. In particular, the absorption coefficient of the material represented in the corresponding voxel can in this case be classified for each voxel of the at least one provisional slice image. The classification can be carried out in particular on the basis of a threshold value classification or threshold value segmentation. With the aid of this classification, each voxel can then be assigned to the first, the second or no material volume.

Alternatively, the segmentation algorithm can be based on an edge segmentation. In particular, edges in the at least one provisional slice image can be detected by use of the segmentation algorithm and the at least one provisional slice image can be subdivided along the edges into a number of subvolumes. In particular, individual subvolumes can be assigned to the first or the second material volume.

Arbitrary other segmentation algorithms are conceivable for segmenting the first and the second material volume.

The inventors have recognized that the first and the second material volume can easily be determined in the at least one provisional slice image by use of a segmentation algorithm.

According to a further embodiment of the invention, each voxel of the plurality of voxels of the at least one provisional slice image comprises a voxel value. The voxel value is in this case dependent on an absorption coefficient of a material represented in the voxel. In this case the segmentation algorithm is based on a threshold value segmentation of the voxel value.

In particular, the voxel value of a voxel is determined by the absorption coefficient of the material represented in the voxel. What is meant by absorption coefficient in this context is the average absorption coefficient of the corresponding material for the x-ray spectrum. Strongly absorbing materials in this case have a greater absorption coefficient than weakly absorbing materials. In particular, the voxel value can correspond to the absorption coefficient. Alternatively, the voxel value can be linearly dependent on the absorption coefficient. In other words, the voxel value can be proportionally dependent on the absorption coefficient.

In particular, the voxel value can correspond to the absorption coefficient normalized by way of a reference absorption coefficient. Alternatively, the voxel value can be exponentially or logarithmically dependent on the absorption coefficient. Alternatively, the voxel value can reveal any arbitrary functional relationship of the absorption coefficient, the functional relationship being strictly monotonically increasing or strictly monotonically decreasing. In particular, the voxel value can be specified in Hounsfield units (HU). In particular, a material in this context may also be a material mix or a composite made up of different materials.

In particular, a first and a second threshold value can be specified for the threshold value segmentation. In particular, all voxels having voxel values lying below the first threshold value cannot be assigned to any material volume. In particular, all voxels having voxel values lying between the first and the second threshold value can be assigned to the first material volume. In particular, the voxels having voxel values lying above the second threshold value can be assigned to the second material volume. Alternatively, the assignment can be made the other way around.

In particular, the first threshold value can be in the region of e.g. 200 HU. In particular, the second threshold value can be in the region of e.g. 2500 HU. Alternatively, the first threshold value can lie between e.g. 100 and 500 HU. Alternatively, the second threshold value can lie between e.g. 2000 and 3000 HU.

The inventors have recognized that the threshold value segmentation constitutes a reliable way of determining the first and the second material volume. The inventors have also recognized that the threshold value segmentation based on the voxel values is not very compute-intensive because no additional (voxel-by-voxel) calculations are necessary in order to determine the first and the second material volume.

According to a further embodiment of the invention, determining the reduced first material volume also comprises the method steps of determining at least one working projection image based on the first and the second material volume via the computing circuit, and of deleting those voxels from the first material volume whose projection in the at least one working projection image overlaps with a projection of a voxel from the second material volume via the computing circuit.

In the method step of determining the at least one working projection image, the at least one working projection image is determined by way of forward projection based on the first and the second material volume. In particular, a working slice image can be determined in order to determine the at least one working projection image. The voxel matrix of the working slice image in this case corresponds in its size or extension or dimensioning to the voxel matrix of the provisional slice image. In this case the voxel values of the working slice image comprise information about whether the corresponding voxel is assigned to the first, the second or no material volume or is included in the latter.

In order to determine the working projection image, line integrals are determined through the working slice image. In this case the line integrals extend in a plane of the voxel matrix. In other words, the line integrals extend parallel to the two-dimensional extension of the voxel matrix. In this case a direction of the line integrals is determined by the acquisition angle. In particular, all the line integrals can extend in the direction of the acquisition angle. In a cone beam geometry, a middle line integral can run along the acquisition angle. All the other line integrals extend according to an aperture angle of the cone beam. Each line integral in this case determines a working pixel value of a pixel of the working projection image.

In particular, a plurality of working projection images can be determined. In particular, the plurality of working projection images can be determined for the plurality of acquisition angles.

In the method step of deleting those voxels from the first material volume whose projection in the at least one working projection image overlaps with a projection of a voxel from the second material volume, the reduced first material volume is determined. The projection of a voxel is determined by the line integral through the voxel onto the working projection image. An overlaying of the projections means that both at least one voxel of the first material volume and at least one voxel of the second material volume lie on a line integral. In other words, in order to determine the reduced first material volume, those voxels are therefore removed from the first material volume which in the case of at least one line integral lie on a common line integral with at least one voxel from the second material volume. In particular, the reduced first material volume therefore comprises a subset of the voxels included in the first material volume. In particular, the subset may be empty. In particular, the subset may be identical to the set of voxels of the first material volume.

The inventors have recognized that by determining the reduced first material volume as described it is possible to reduce or remove negative effects of the strongly absorbing materials on the two-component beam hardening correction.

According to a further embodiment of the invention, each reduced projection image of the plurality of reduced projection images comprises a plurality of pixels. In this case each pixel of the plurality of pixels comprises a reduced pixel value. The method step of determining the plurality of reduced projection images in this case comprises the method step of multiplying each reduced pixel value by a weighting factor via the computing circuit.

In particular, the plurality of pixels of a reduced projection image can be arranged in a pixel matrix. In particular, the size of each reduced projection image can be identical to the size of a projection image of the plurality of projection images. In other words, each reduced projection image can comprise exactly the same number of pixels as a projection image of the plurality of projection images. In particular, the pixel matrix of each reduced projection image can be identical in the two-dimensional extension to the pixel matrix of a projection image of the plurality of projection images.

As described above, a reduced pixel value of a reduced projection image can then describe which intensity value of the monochromatic x-ray radiation would be measured if an examination subject that comprises only the reduced first material volume is exposed to the monochromatic x-ray radiation. The first material volume can be underestimated due to scattered radiation and other effects. In other words, too few voxels can be assigned to the first material volume during the determination of the first material volume. In particular, the reduced first material volume can then also be underestimated. In particular, the reduced pixel values of the reduced projection image are then distorted. In particular, the reduced pixel values are on average too low or too small. Alternatively, the reduced pixel values can be on average too high or too large.

In the method step of multiplying each reduced pixel value by the weighting factor, the distorted pixel values can be corrected on average. In particular, the weighting factor can be determined empirically and/or by way of simulations. Alternatively or in addition, the weighting factor can be determined automatically, for example by way of machine learning and/or deep learning. In particular, the weighting factor can be device-specific. In other words, the weighting factor can be dependent on the medical device. In particular, the weighting factor can be 1.25, for example. In particular, the weighting factor can assume an arbitrary value between 0.5 and 2.0. In particular, the weighting factor can be the same for each reduced projection image.

The inventors have recognized that by multiplying the reduced pixel values of all of the reduced projection images by the weighting factor it is possible to compensate for errors in the reduced projection images caused by an erroneous or inaccurate determination of the first material volume or inaccuracies and/or errors in the segmentation of the first material volume.

According to a further embodiment of the invention, the at least one slice image comprises a plurality of voxels. In this case each voxel of the plurality of voxels comprises a voxel value. In this case the method also comprises the method step of multiplying each voxel value of the at least one slice image by an adjustment factor.

In particular, each voxel value of the plurality of voxels of the at least one slice image can be multiplied voxel by voxel by the adjustment factor. In particular, the adjustment factor can be determined empirically and/or by way of simulations. Alternatively or in addition, the adjustment factor can be determined by automated means, for example by way of machine learning and/or deep learning. In particular, the adjustment factor can be device-specific. In other words, the adjustment factor can be dependent on the medical device. In this case the adjustment factor can assume an arbitrary value between 0.9 and 1.1. In particular, the adjustment factor can be 0.97, for example.

The inventors have recognized that by multiplying the voxel values by the adjustment factor it is possible to correct inaccuracies that occur due to the various method steps in relation to the voxel value. The inventors have also recognized that a correctness of a quantitative statement of the voxel values can be ensured in this way.

According to a further embodiment of the invention, the at least one projection image is acquired via a cone-beam computed tomography system.

In particular, the at least one projection image is acquired via a C-arm or a cone-beam x-ray device.

The inventors have recognized that the method is embodied in particular to correct artifacts in at least one slice image which has been acquired via a cone-beam computed tomography device or C-arm device. In other words, the inventors have recognized in particular that the method is suitable for correcting scattered radiation artifacts and/or beam hardening artifacts in at least one slice image which has been acquired using a medical device that has a cone-beam geometry.

At least one embodiment of the invention further relates to a reconstruction system for performing artifact correction during a reconstruction of at least one slice image from a plurality of projection images, the reconstruction system comprising an interface and a computing circuit, including at least one processor, for example. In this case the interface and/or the computing circuit are/is embodied to provide the plurality of projection images.

In this case each projection image of the plurality of projection images comprises a plurality of pixels, each pixel of the plurality of pixels comprising a pixel value. In this case the computing circuit is also embodied to determine a plurality of corrected projection images. In this case the computing circuit is also embodied to reconstruct the at least one slice image based on the plurality of projection images. In this case the interface and/or the computing circuit are/is also embodied to provide the at least one slice image.

The determining of the plurality of corrected projection images for each projection image of the plurality of projection images in this case comprises the computing circuit being embodied to determine an average pixel value in at least one subarea of the projection image, as well as to determine a correction value by multiplying the average pixel value by a scatter factor and as well as to determine a plurality of corrected pixel values by subtracting the correction value from the plurality of pixel values. In this case a corrected projection image of the plurality of corrected projection images comprises a plurality of pixels which comprise the plurality of corrected pixel values.

Such a system can be embodied in particular to carry out the method of an embodiment for performing artifact correction during a reconstruction of at least one slice image from a plurality of projection images and its aspects. The system is embodied to carry out the method and its embodiments in that the interface and the computing circuit are embodied to perform the corresponding method steps. In particular, the interface can comprise one or more subsidiary interfaces. In particular, the computing circuit can comprise one or more subsidiary computing circuits.

At least one embodiment of the invention also relates to a computer program product comprising a computer program, as well as to a computer-readable medium. A largely software-based implementation has the advantage that reconstruction systems already used previously in the prior art can also be easily upgraded by way of a software update in order to operate in the manner described. In addition to the computer program, such a computer program product may, where applicable, comprise additional constituent parts such as e.g. a set of documentation and/or additional components, as well as hardware components, such as e.g. hardware keys (dongles, etc.) to enable use of the software.

In particular, at least one embodiment of the invention also relates to a computer program product comprising a computer program which can be loaded directly into a memory of a reconstruction system, and having program sections for carrying out all steps of at least one embodiment of the method for performing artifact correction during a reconstruction of at least one slice image from a plurality of projection images and its aspects when the program sections are executed by the reconstruction system.

In particular, at least one embodiment of the invention relates to a computer-readable storage medium on which are stored program sections that can be read and executed by a determination system in order to carry out all steps of an embodiment of the method for performing artifact correction during a reconstruction of at least one slice image from a plurality of projection images and its aspects when the program sections are executed by the reconstruction system.

FIG. 1 shows a first example embodiment of a method for performing artifact correction during a reconstruction of at least one slice image from a plurality of projection images.

In the method step of providing PROV-1 the plurality of projection images, the plurality of projection images are provided by a database. The database is in this case a PACS. Alternatively, the database may be a database of a medical device which is embodied to acquire the plurality of projection images. Alternatively, the database may be an arbitrary external database. In particular, the database may be resident or stored on a cloud system or on a server system. Alternatively, the database may be an internal database. Alternatively, the plurality of projection images may be provided by an internal or external memory or storage unit. The internal or external memory or storage unit may be in particular a hard disk drive, a USB stick, a CD, a DVD, a memory card, etc.

Each projection image of the plurality of projection images comprises a plurality of pixels, each pixel comprising a pixel value. Each projection image represents a projection of an examination subject in a plane of the projection image. For this purpose, the examination subject is positioned between an x-ray source and a detector. In this case each pixel value comprises a line integral of an x-ray beam from the x-ray source through the examination subject to the detector. The detector detects or captures or measures an intensity of the x-ray radiation transmitted by the x-ray source. The pixel value of a pixel therefore corresponds to the intensity of the x-ray radiation at the corresponding point of the detector. The plurality of pixels of a projection image are arranged in a pixel matrix. The pixel matrix is two-dimensional. The pixel matrix has in particular a square or rectangular shape. In particular, each projection image may already have been preprocessed using standard methods. In particular, a standard scattered radiation correction method, as described in Zellerhoff et al. "Low contrast 3D reconstruction from C-arm data", Proceedings of SPIE Vol. 5745, 2005, may already have been performed.

In particular, each of the projection images may have been acquired for a different acquisition angle relative to the examination subject. In particular, the x-ray source and the detector can rotate around the examination subject and generate a plurality of projection images for different acquisition angles relative to the examination subject.

In the method step of determining DET-1 a plurality of corrected projection images, a plurality of projection images corrected for scattered radiation are determined. The method step comprises several method steps. The method steps are carried out for each projection image of the plurality of projection images. In the process, a corrected projection image is determined in each case. In other words, a corrected projection image is determined for each projection image.

In the method step of determining DET-11 an average pixel value, the average pixel value is determined in a subarea of the projection image. The subarea of the projection image comprises a continuous section of the pixel matrix. The subarea in this case comprises a ninth of the pixel matrix. Alternatively, the subarea may in particular comprise the entire pixel matrix. Alternatively, the subarea may comprise for example half, a quarter or an eighth of the pixel matrix. The subarea is arranged centrally in the pixel matrix. In other words, the subarea is arranged spaced at a distance from the edge of the pixel matrix if the subarea does not comprise the entire pixel matrix. In order to determine DET-11 the average pixel value, the pixel values are summed and the sum is divided by the number of pixels in the subarea. Next, the average pixel value is determined by applying the delogarithm to the negative result. The delogarithm corresponds to the exponential function.

The following applies:

$$PW\_Dom = \frac{1}{N}\sum_{i=1}^{N} PW_i$$

and $$\overline{PW} = e^{-PW\_Dom},$$

where N describes the number of pixels in the subarea, $PW_i$ the pixel values in the subarea, and $\overline{PW}$ the average pixel value.

Alternatively, the delogarithmizing of the pixel values can be dispensed with. Alternatively, the result itself can be delogarithmized.

In the method step of the of determining DET-12 a correction value, the correction value is determined by multiplying the average pixel value by a scatter factor:

$$K = \overline{PW} \times s,$$

where K is the correction value and s the scatter factor.

The scatter factor is in this case determined empirically and/or by way of a simulation. Alternatively or in addition, the scatter factor can also be determined by way of machine learning and/or deep learning. The scatter factor equals 0.075. In particular, the scatter factor can be less than 1. In particular, the scatter factor can lie between 0 and 0.2. In particular, the scatter factor can be device-specific.

In the method step of determining DET-13 a plurality of corrected pixel values, the plurality of corrected pixel values are determined by subtracting the correction value from the plurality of pixel values. In other words, the plurality of corrected pixel values are determined by subtracting the correction value from each pixel value of the plurality of pixel values. If the delogarithm was applied in order to determine DET-11 the average pixel value, the correction value is subtracted or deducted from the delogarithmized pixel values. If the delogarithm was applied to the negative result in order to determine DET-11 the average pixel value, the correction value is subtracted or deducted from the delogarithmized negative pixel values. In this case the corrected pixel values are subsequently logarithmized again and negated:

$$PW_{korr,l} = -\ln(e^{-Pwl} - K) \text{ mit } l \in \{1, 2, \ldots, M\},$$

where M describes the number of pixels of the plurality of pixels in the projection image. $PW_l$ in this case describes a pixel value of the plurality of pixel values of the projection image, and $PW_{korr,l}$ corrected pixel value.

In this case a corrected projection image of the plurality of corrected projection images comprises a plurality of pixels which comprise the plurality of corrected pixel values. In this case the plurality of pixels of the corrected projection image are arranged analogously to the plurality of pixel values of the projection image. In particular, the plurality of the pixels of the corrected projection image are likewise arranged in a pixel matrix. In particular, the pixel matrices of the projection image and of the corrected projection image have identical dimensions.

In this way, the at least one projection image can be corrected for scattered radiation.

In the method step of reconstructing REC-1 the at least one slice image, the at least one slice image is reconstructed based on the plurality of corrected projection images. In particular, the at least one slice image can be reconstructed by way of filtered backprojection. In particular, other standard algorithms or methods for reducing artifacts can be applied during the reconstruction. For example, a truncation correction can be applied. Alternatively or in addition, a water correction can be applied. The water correction corrects so-called cupping artifacts, which also occur in homogeneous materials due to beam hardening in the slice image.

In the method step of providing PROV-2 the at least one slice image, the at least one slice image is provided. This entails loading the at least one slice image into the PACS. Alternatively, the at least one slice image can be loaded into a different database. In particular, this can be an external or internal database which can be embodied as described above. In particular, the at least one slice image can be stored on a storage medium which can be embodied as described above. In particular, the at least one slice image can be displayed to a user via a display unit.

Figure 2:
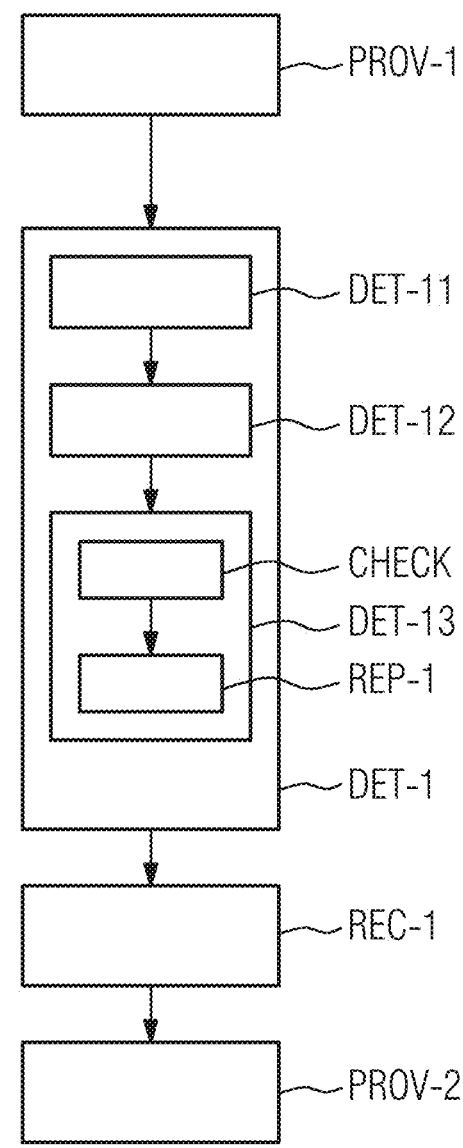
FIG. 2 shows a second example embodiment of a method for performing artifact correction during a reconstruction of at least one slice image from a plurality of projection images.

FIG. 2 shows a second example embodiment of a method for performing artifact correction during a reconstruction of at least one slice image from a plurality of projection images.

The method steps already described in connection with FIG. 1 can be performed in this example embodiment as described according to the description relating to FIG. 1.

The method step of determining DET-13 a plurality of corrected pixel values comprises two method steps in this example embodiment. The method steps are performed for each corrected pixel value of all the corrected projection images.

In the method step of checking CHECK whether the corrected pixel value falls below a minimum value, a check is carried out for each corrected pixel value of the plurality of corrected pixel values to determine whether the corrected pixel value comprises a physically meaningful value. If the delogarithm was applied in order to determine DET-11 the average pixel value, the check is carried out for the plurality of delogarithmized corrected pixel values. If the delogarithm was applied to the negative result in order to determine DET-11 the average pixel value, the check is carried out for the plurality of delogarithmized negative corrected pixel values. The application example shown here relates to the last-mentioned case. The minimum value is in this case a fraction of the correction value. In other words, the minimum value is the result of a multiplication of the correction value by a safety value. The minimum value is positive in this case. The safety value is less than one in this case. In this example embodiment, the safety value is 0.5. The safety value is determined empirically and/or by way of simulation. Alternatively or in addition, the safety value can be determined automatically for example by way of machine learning or deep learning.

In the method step of replacing REP-1 the corrected pixel value, the corrected pixel value is replaced by the minimum value if the corrected pixel value falls below the minimum value. If the delogarithm was applied in order to determine DET-11 the average pixel value, the delogarithmized corrected pixel value is replaced by the minimum value. In this case the delogarithmized pixel value corresponding to the minimum value is subsequently logarithmized again. In other words, the corrected pixel value is then replaced by the logarithmized minimum value. If the delogarithm was applied to the negative result in order to determine DET-11 the average pixel value, then, as shown in the following, the delogarithmized negative corrected pixel value is replaced by the minimum value. In this case the delogarithmized negative pixel value corresponding to the minimum value is subsequently logarithmized again and negated. In other words, the corrected pixel value is then replaced by the negative logarithmized minimum value.

The two method steps of checking CHECK whether the delogarithmized negative corrected pixel value falls below the minimum value and of replacing REP-1 the corrected pixel value by the negated logarithmized minimum value can be described using the following pseudocode:

$MW = SW \times K$ $\text{if}((e^{-PW_l} - K) \leq MW)$

{

$PW_{korr,l} = -\ln(MW)$

}

$\text{mit } l \in \{1, 2, \ldots, M\},$ where MW is the minimum value and SW the safety value.

Figure 3:
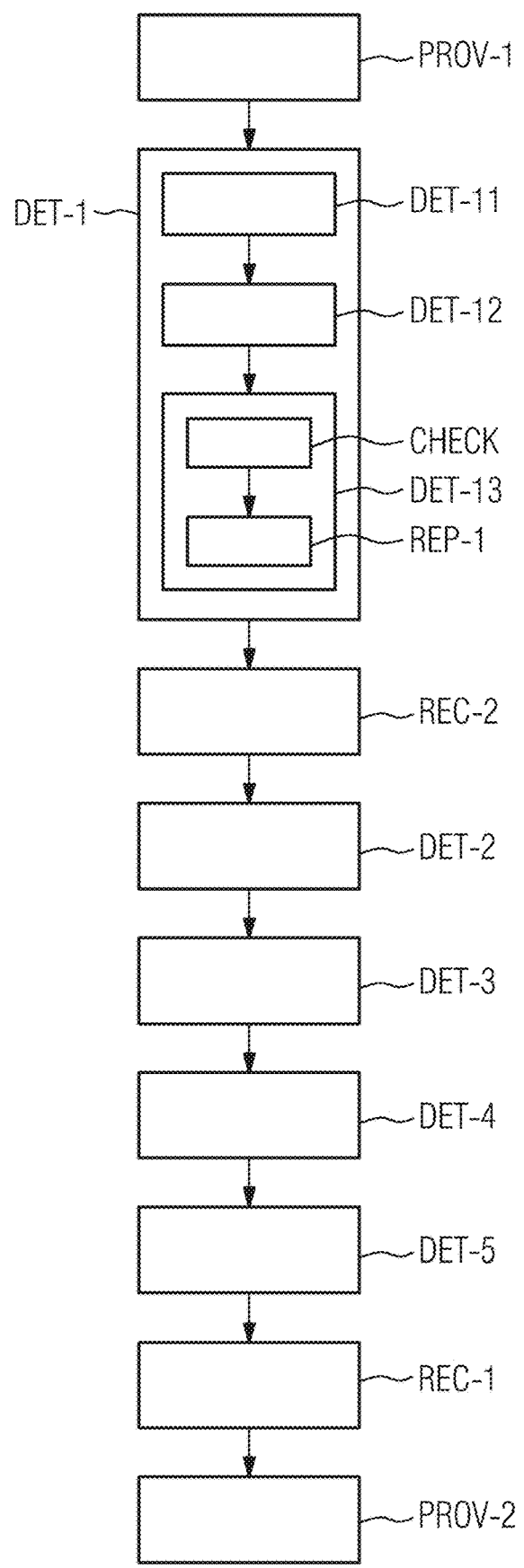
FIG. 3 shows a third example embodiment of a method for performing artifact correction during a reconstruction of at least one slice image from a plurality of projection images.

FIG. 3 shows a third example embodiment of a method for performing artifact correction during a reconstruction of at least one slice image from a plurality of projection images.

The method steps already described in connection with FIGS. 1 and 2 can be performed in this example embodiment as described according to the description relating to FIGS. 1 and 2.

Immediately following the scattered radiation correction described with reference to FIGS. 1 and/or 2, a beam hardening correction is performed in this example embodiment. The beam hardening correction enables beam hardening artifacts caused by strongly absorbing to be reduced or removed materials in the at least one slice image. Strongly absorbing materials absorb in particular x-ray radiation more strongly than bone. In interventional imaging, strongly absorbing materials can be in particular a metal of a catheter and/or stent, a contrast agent and/or an embolization material.

In the method step of reconstructing REC-2 at least one provisional slice image, at least one provisional slice image is reconstructed based on the plurality of corrected projection images. Each corrected projection image may in this case be preprocessed as described according to FIG. 1. The at least one provisional slice image is reconstructed or determined by way of filtered backprojection based on the plurality of corrected projection images. In the course of the reconstruction, in particular artifact correction algorithms can be executed in the at least one provisional slice image. In particular, an algorithm for reducing truncation artifacts and/or a water correction algorithm can be executed.

The at least one provisional slice image comprises a plurality of voxels. A voxel is in this case embodied in a cube shape. In other words, a voxel is embodied three-dimensionally. In particular, the voxel can have three identical edge lengths. Each voxel in this case comprises a voxel value. The voxel value describes in particular the absorption properties of a material at the corresponding point in the examination subject. In particular, the voxel values can be specified in Hounsfield units (HU). The plurality of voxels are arranged in particular in a voxel matrix. In this case the voxel matrix is in particular extended in two dimensions.

In the method step of determining DET-2 a first material volume MV-1, the first material volume MV-1 is determined within the at least one provisional slice image. In this case a subvolume of the at least one provisional slice image is determined which can be assigned to the first material volume. The subvolume can in this case comprise a continuous section in the first material volume MV-1.

Alternatively, the subvolume can comprise several non-continuous sections of the provisional slice image. In particular, the first material volume MV-1 can comprise a subset of the plurality of voxels. The subset can comprise in particular an empty set or the entire plurality of voxels of the at least one provisional slice image. The first material volume MV-1 in this case comprises the voxels of the plurality of voxels which can be assigned to a first material or a first material group. In this case the first material volume comprises those voxels which can be assigned to the material "bone". The voxels can be assigned in particular by way of a segmentation algorithm'. The segmentation is performed based on the voxel values. In this case voxels having a voxel value between 200 HU and 2500 HU can be assigned to the first material volume. In other words, a threshold value segmentation can be performed with a first threshold value at 200 HU and a second threshold value at 2500 HU.

Alternatively, the first threshold value can assume a different value. Alternatively, the second threshold value can also assume a different value.

In the step of determining DET-3 a second material volume MV-2, the second material volume is determined in the at least one provisional slice image analogously to the determining DET-2 of the first material volume MV-1. In particular, the second material volume MV-2 can comprise a subvolume of the at least one provisional slice image. In particular, the subvolume of the second material volume MV-2 can comprise a continuous or a non-continuous section of the at least one provisional slice image. In particular, the second material volume MV-2 comprises the subvolume of the at least one provisional slice image which can be assigned to the strongly absorbing materials. In this case the second material volume MV-2 can comprise a subset of the plurality of voxels. In particular, the second material volume MV-2 can comprise no or all voxels of the plurality of voxels. The first and the second material volume MV-1, MV-2 are disjoint in this case.

In other words, the first and the second material volume MV-1, MV-2 cannot overlap one another. In other words, the assignment of the voxels to the first, the second or no material volume MV-1, MV-2 is unique. Alternatively, the first and the second material volume MV-1, MV-2 can overlap. In other words, at least one voxel of the plurality of voxels can be assigned to the first and the second material volume MV-1, MV-2. The assignment can be effected by way of a segmentation algorithm'. The segmentation algorithm can be embodied as described above. The second material volume can be assigned those voxels whose voxel value lies above the second threshold value. In this way, the second material volume MV-2 is assigned those voxels in which a more strongly absorbing material than bone is represented. In particular, the voxels whose voxel values lie below the first threshold value are not assigned to any material volume.

In the method step of determining DET-4 a reduced first material volume MV-1', the reduced first material volume MV-1' is determined based on the first and the second material volume MV-1, MV-2. In this case, based on the first and the second material volume MV-1, MV-2, the voxels which are assigned to the first material volume MV-1 are reduced as a function of the second material volume MV-2. This means that voxels of the first material volume MV-1 which are not included in the reduced first material volume MV-1' are determined as a function of the second material volume MV-2. All other voxels of the first material volume MV-1 are also included in the reduced first material volume MV-1'.

In the method step of determining DET-5 a plurality of reduced projection images, the plurality of reduced projection images are determined based on the reduced first material volume MV-1'. In this case each pixel of each reduced projection image comprises a reduced pixel value. In particular, each reduced projection image can comprise the same number of pixels as a projection image of the plurality of projection images. In this case the pixels of each reduced projection image can be arranged just like the pixels of a projection image of the plurality of projection images. Each reduced projection image is determined by projection of the reduced first material volume MV-1' along a projection axis. The projection axis in this case lies in the voxel matrix of the at least one provisional slice image. The projection axis is determined by the acquisition angle. The plurality of reduced projection images are determined in this case for a plurality of pairwise distinct acquisition angles or projection axes.

In order to determine DET-5 the plurality of reduced projection images, the voxel values of the voxels of the provisional slice image which are assigned to the reduced first material volume MV-1' are set to a monochromatic average HU value for bone. All other voxels can be set to "0". A reduced projection image of the plurality of projection images can be determined by forward projection along a projection axis or an acquisition angle of the thus preprocessed slice image. In other words, a reduced projection image can be determined by forward projection of the at least one provisional slice image in which the reduced first material volume MV-1' is segmented. In this case a pixel value of a pixel of the reduced projection image corresponds to a line integral through the segmented provisional slice image along the projection direction. In other words, the reduced projection image corresponds to a monochromatic projection image of a bone of the examination subject. The plurality of reduced projection images are determined by forward projection of the preprocessed or segmented provisional slice image along the plurality of projection axes or acquisition angles.

Next, the at least one slice image is reconstructed as described above. In this case the reconstruction is determined based on the plurality of corrected projection images and the plurality of reduced projection images. In this case a two-component beam hardening correction can be carried out based on the plurality of reduced projection images. Possible algorithms for a two-component beam hardening correction of the type are described for example in Zhao et al., "Multi-materials beam hardening artifacts correction for computed tomography (CT) based on X-ray spectrum estimation", arXiv: 1812.02365v1, 2018, or Krumm et al., "Beam Hardening Correction of Multi-Material Objects", 10th European Conference of Non-Destructive Testing, 2010 (https://www.ndt.net/article/ecndt2010/reports/1_09_27.pdf). In particular, a reduced projection image in this case corresponds in each case to a forward-projected segmented slice image.

Figure 4:
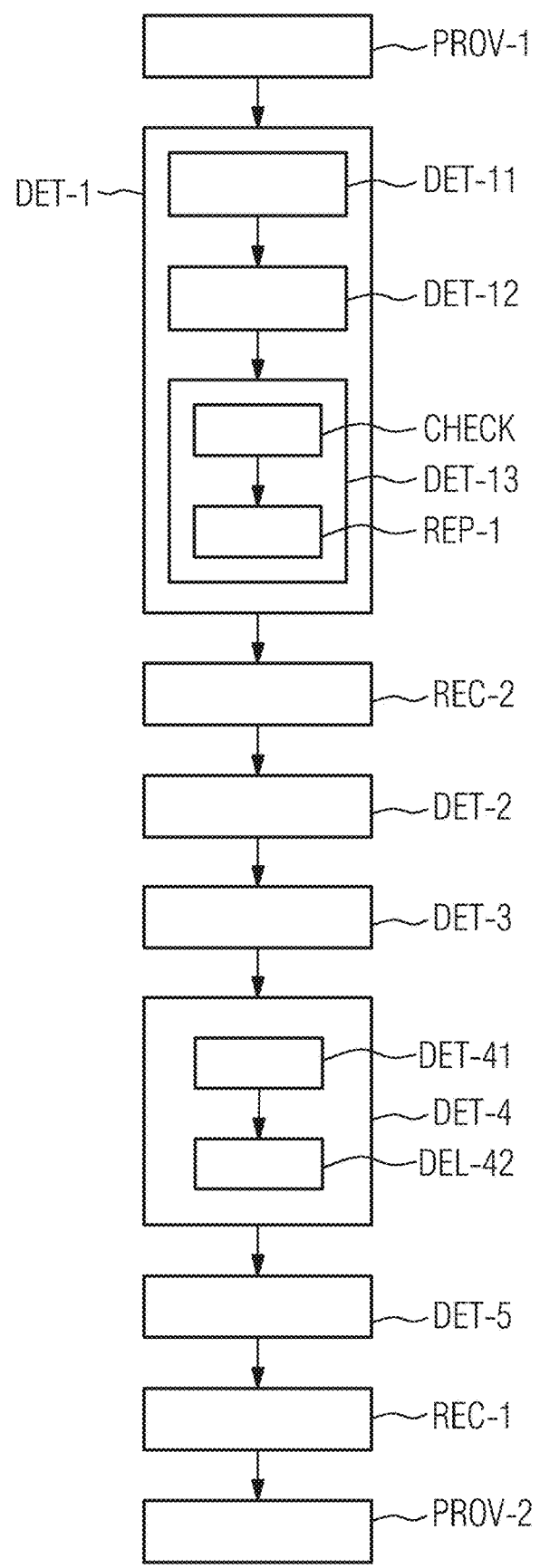
FIG. 4 shows a fourth example embodiment of a method for performing artifact correction during a reconstruction of at least one slice image from a plurality of projection images.

FIG. 4 shows a fourth example embodiment of a method for performing artifact correction during a reconstruction of at least one slice image from a plurality of projection images.

The method steps already described in connection with FIGS. 1 to 3 can be performed in this example embodiment as described according to the description relating to FIGS. 1 to 3.

In the example embodiment shown in FIG. 4, the method step of determining DET-4 the reduced first material volume MV-1' is subdivided into two method steps.

In the method step of determining DET-6 the at least one working projection image APB-1, APB-2, the at least one working projection image APB-1, APB-2 is determined based on the first and the second material volume MV-1, MV-2. A working slice image ASB can be determined for this purpose. The working slice image ASB comprises exactly the same number of voxels as the at least one provisional slice image. The arrangement of these voxels is identical to the arrangement of the voxels in the at least one provisional slice image. Each voxel in this case comprises information indicating whether it is assigned to the first, the second or no material volume MV-1, MV-2. The at least one working projection image APB-1, APB-2 is determined based on the at least one working slice image.

For this purpose, the working slice image ASB is projected onto the at least one working projection image APB-1, APB-2 along a projection axis. The direction of the projection axis is in this case dependent on an acquisition angle. The projection axis lies in the plane of the voxel matrix of the working slice image ASB. In this case the working projection image APB-1, APB-2 comprises a plurality of pixels. Each pixel in this case comprises a working pixel value. In this case the at least one working projection image APB-1, APB-2 comprises the same number of pixels as a projection image of the plurality of projection images. In this case the pixels of the at least one working projection image APB-1, APB-2 are arranged just like the pixels of the projection image. Each working pixel value is determined by a line integral through the working slice image in the direction of the acquisition angle. A direction of the line integral is determined in particular by the direction of the projection axis.

In particular, a plurality of working projection images APB-1, APB-2 can be determined for a plurality of acquisition angles. In particular, the plurality of acquisition angles of the plurality of working projection images can correspond to a plurality of acquisition angles of the plurality of projection images.

In the method step of deleting DEL-42 those voxels from the first material volume MV-1 whose projection in the at least one working projection image APB-1, APB-2 is overlaid with a projection of a voxel from the second material volume MV-2, the reduced first material volume MV-1' is determined. The projection of a voxel is determined by the line integral through the voxel onto the working projection image APB-1, APB-2. Thus, if both at least one voxel from the first material volume MV-1 and at least one voxel from the second material volume MV-2 lie on a line integral, the corresponding voxel or the corresponding voxels is/are deleted from the first material volume MV-1. In other words, the reduced first material volume MV-1' is determined by removing all voxels from the first material volume MV-1 which lie on a line integral with at least one voxel from the second material volume MV-2, or whose projections overlay one another.

If a plurality of working projection images are determined for a plurality of acquisition angles, there remain in the reduced first material volume MV-1' only those voxels of the first material volume MV-1 whose projection is overlaid in no working projection image APB-1, APB-2 with a projection of at least one voxel from the second material volume MV-2.

The method steps for determining DET-4 the reduced first material volume MV-1' will become clearer in connection with FIG. 8.

Figure 5:
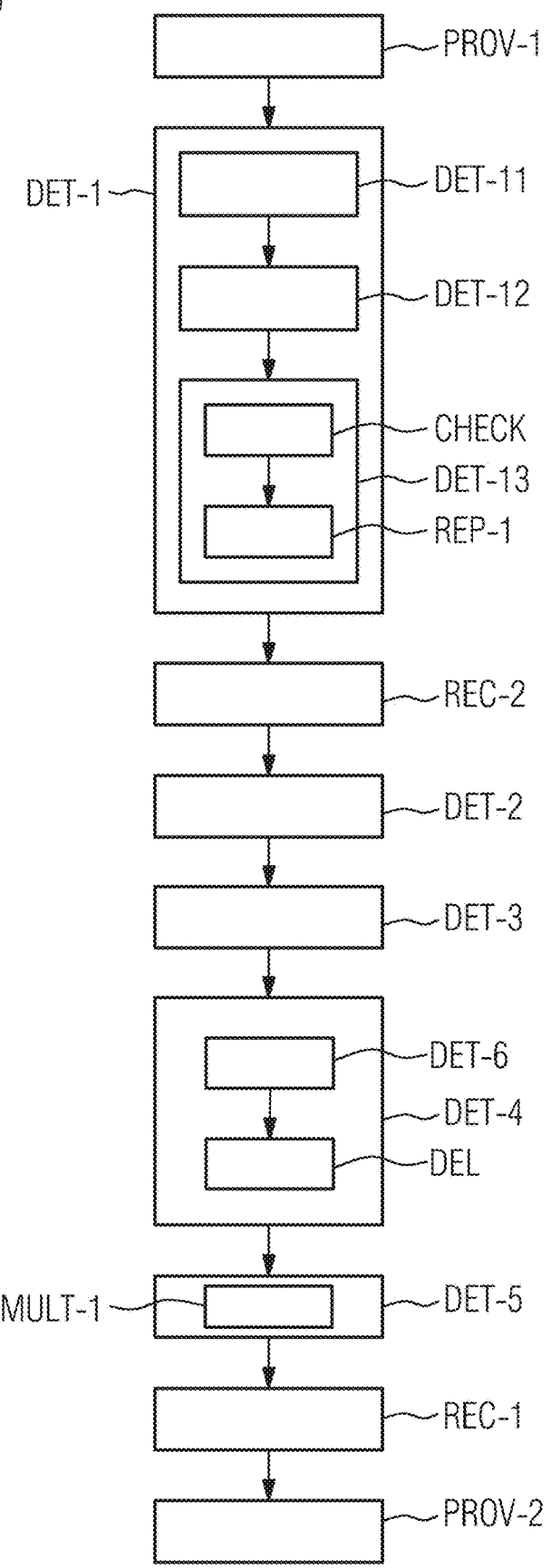
FIG. 5 shows a fifth example embodiment of a method for performing artifact correction during a reconstruction of at least one slice image from a plurality of projection images.

FIG. 5 shows a fifth example embodiment of a method for performing artifact correction during a reconstruction of at least one slice image from a plurality of projection images.

In this example embodiment, the method steps already described in connection with FIGS. 1 to 4 can be performed as described according to the description relating to FIGS. 1 to 4.

In the example embodiment according to FIG. 5, the method step of determining DET-5 the plurality of reduced projection images also comprises the method step of multiplying MULT-1 each reduced pixel value of each reduced projection image by a weighting factor.

In other words, each reduced pixel value of each reduced projection image of the plurality of reduced projection images is multiplied by a weighting factor. Due to scattered radiation and/or beam hardening artifacts in the provisional slice image, the first material volume MV-1 may comprise too few voxels. In other words, too few voxels may be assigned to the first material volume MV-1. The bone volume or the volume of the first material or of the first material group can be underestimated as a result. In order to correct these errors, each reduced pixel value is multiplied by the weighting factor, as described above. The weighting factor is greater than 1 in this case. The weighting factor is in particular 1.25. The weighting factor can be determined empirically and/or by way of simulation. Alternatively or in addition, the weighting factor can be determined by way of machine learning and/or deep learning.

Figure 6:
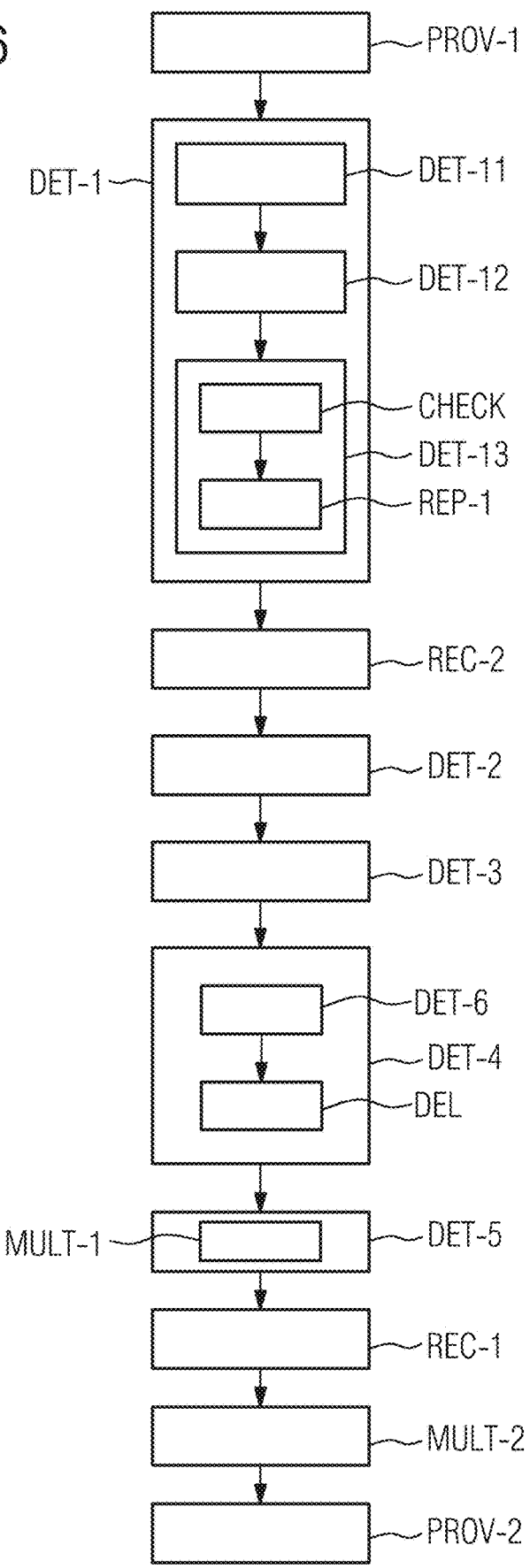
FIG. 6 shows a sixth example embodiment of a method for performing artifact correction during a reconstruction of at least one slice image from a plurality of projection images.

FIG. 6 shows a sixth example embodiment of a method for performing artifact correction during a reconstruction of at least one slice image from a plurality of projection images.

In this example embodiment, the method steps already described in connection with FIGS. 1 to 5 can be performed as described according to the description relating to FIGS. 1 to 5.

In the example embodiment according to FIG. 6, the at least one slice image comprises a plurality of voxels. In this case each voxel comprises a voxel value. In the method step of multiplying MULT-2 the voxel value of the slice image by an adjustment factor, the at least one slice image is corrected quantitatively. For this purpose, each voxel is multiplied voxel by voxel by the adjustment factor. In this way it is ensured that a voxel value of the at least one slice image comprises a correct quantitative statement concerning the material represented in the voxel. In particular, the voxel value is specified in Hounsfield units (HU). The adjustment factor is in particular 0.97. Alternatively, the adjustment factor can assume a different value. In particular, the adjustment factor is device-specific. In particular, the adjustment factor is determined empirically and/or by way of simulation. Alternatively or in addition, the adjustment factor can be determined by way of machine learning and/or deep learning.

Figure 7:
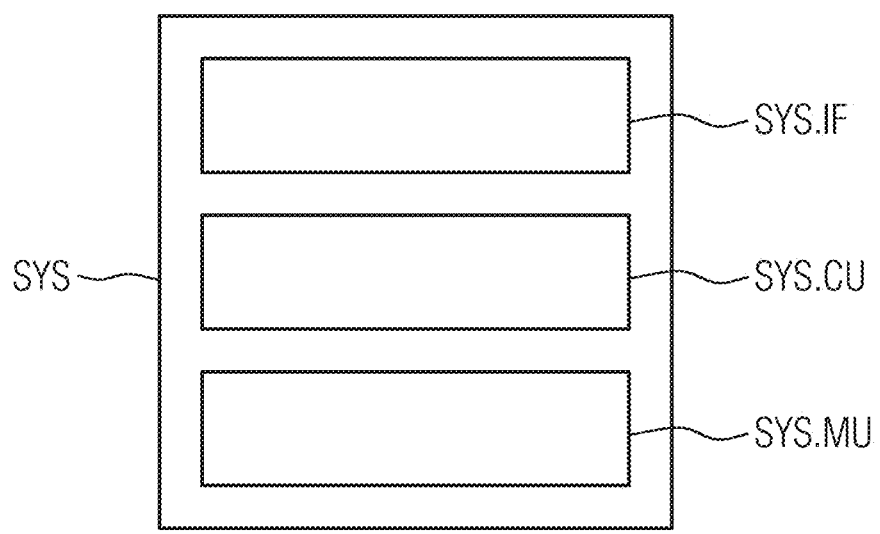
FIG. 7 shows a system for performing artifact correction during a reconstruction of at least one slice image from a plurality of projection images.

FIG. 7 shows a system SYS for performing artifact correction during a reconstruction of at least one slice image from a plurality of projection images.

The illustrated system SYS for performing artifact correction during a reconstruction of at least one slice image from a plurality of projection images is embodied to carry out an inventive method for performing artifact correction during a reconstruction of at least one slice image from a plurality of projection images. The system SYS comprises an interface SYS.IF, a computing circuit SYS.CU and a memory unit SYS.MU.

The system SYS may be in particular a computer, a microcontroller or an integrated circuit (IC). Alternatively, the system SYS may be a real or virtual computer network (a technical term for a real computer network is "cluster", a technical term for a virtual computer network is "cloud"). The system SYS may also be embodied as a virtual system that is implemented on a computer or a real computer network or a virtual computer network (a technical term is "virtualization").

The interface SYS.IF may be a hardware or software interface (e.g. a PCI bus, USB or Firewire). The computing circuit SYS.CU may comprise hardware and/or software components, for example a microprocessor or a device known as an FPGA (Field Programmable Gate Array). The memory unit SYS.MU may be embodied as a volatile working memory known as RAM (Random Access Memory) or as a nonvolatile mass storage device (hard disk drive, USB stick, SD card, solid state disk (SSD)).

The interface SYS.IF may in particular comprise a plurality of subsidiary interfaces that perform different method steps of the respective inventive method. In other words, the interface SYS.IF may be embodied as a plurality of interfaces SYS.IF. The computing circuit SYS.CU may in particular comprise a plurality of subsidiary computing circuits that perform different method steps of the respective inventive method. In other words, the computing circuit SYS.CU may be embodied as a plurality of computing circuits SYS.CU.

FIG. 8 shows a working slice image ASB for determining DET-41 a working projection image APB-1, APB-2.

The working slice image ASB is shown in a). The working slice image ASB in this case comprises 36 voxels. Each voxel in this case comprises information indicating whether it is assigned to the first material volume MV-1, the second material volume MV-2 or no material volume. As illustrated in the figure, voxels assigned to the first material volume MV-1 are indicated by diagonal hatching, voxels assigned to the second material volume MV-2 are indicated by squared hatching, and voxels assigned to no material volume are shown with no hatching.

The step of determining DET-41 a working projection image APB-1 is shown in b). The arrows indicate the projection onto a pixel of the working projection image APB-1. In other words, the arrow illustrates a line integral through the working slice image ASB onto a pixel of the working projection image APB-1. The arrows in this case run parallel to a projection axis. The direction of the projection axis is determined by an acquisition angle. The projection axis lies in a plane of the working slice image ASB. The voxels lying on an arrow in this case are projected onto a common pixel. For the sake of simplicity, the arrows are depicted running in parallel in the drawing.

In a cone-beam geometry, the line integrals or arrows can be fanned out according to an aperture angle of the cone beam. An acquisition angle can then be determined in particular by a middle direction of the line integrals or arrows. Voxels assigned to the first material volume MV-1 and lying on an arrow or line integral having at least one voxel assigned to the second material volume MV-2 are removed from the first material volume MV-1 in order to determine DET-4 the reduced first material volume MV-1'. In other words, voxels from the first material volume MV-1 that are projected onto the same pixel of the working projection image APB-1 as at least one voxel from the second material volume MV-2 are removed from the first material volume MV-1 in order to determine DET-4 the reduced first material volume MV-1'. Such a case occurs in b) for the middle two arrows or line integrals.

The step of determining DET-41 a working projection image APB-2 for a second acquisition angle is shown in c). In the working projection image APB-2 determined here, further voxels of the first material volume MV-1 lie on the same arrow or line integral having at least one voxel of the second material volume MV-2 as in b).

In d), the reduced first material volume MV-1' based on the two working projection images APB-1, APB-2 is shown in an adapted working slice image ASB'. The reduced first material volume MV-1' can be determined based on an arbitrary number of working projection images APB-1, APB-2. In this case, in particular the number of working projection images APB-1, APB-2 can be the same as the number of the plurality of projection images that are used for reconstructing REC-1 the at least one slice image. In particular, the plurality of acquisition angles of the working projection images APB-1, APB-2 can be the same as the plurality of acquisition angles of the plurality of projection images.

Where not yet explicitly realized, though beneficial and within the meaning of the invention, individual example embodiments and individual subordinate aspects or features thereof may be combined with one another or interchanged without leaving the scope of the present invention. Advantages of the invention that are described with reference to one example embodiment are also relevant, where applicable, to other example embodiments without being cited explicitly.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for artifact correction during a reconstruction of at least one slice image from a plurality of projection images, the method comprising:
   providing the plurality of projection images, each projection image of the plurality of projection images including a plurality of pixels and each pixel of the plurality of pixels including a pixel value;
   determining a plurality of corrected projection images based on the plurality of projection images via a computing circuit;

reconstructing the at least one slice image based on the plurality of corrected projection images; and providing the at least one slice image, wherein the determining of the plurality of corrected projection images, for each respective projection image of the plurality of projection images, comprises:

determining an average pixel value in at least one subarea of the respective projection image, determining a respective correction value by multiplying the average pixel value by a scatter factor, and determining a plurality of corrected pixel values by subtracting the respective correction value from the plurality of pixel values of the respective projection image, and for each respective corrected pixel value checking whether the respective corrected pixel value is below a minimum threshold, and replacing the respective corrected pixel value by the minimum value in response to the corrected pixel value falling below the minimum value, wherein a respective corrected projection image of the plurality of corrected projection images includes a plurality of pixels including the plurality of corrected pixel values.

2. The method of claim 1, further comprising:

reconstructing at least one provisional slice image based on the plurality of corrected projection images via the computing circuit, determining a first material volume within the at least one provisional slice image via the computing circuit, determining a second material volume within the at least one provisional slice image, determining a reduced first material volume based on the first material volume and the second material volume, determining a plurality of reduced projection images based on the reduced first material volume, wherein the reconstructing of the at least one slice image is based on the plurality of corrected projection images and the plurality of reduced projection images.

3. The method of claim 2, wherein the at least one provisional slice image includes a plurality of voxels, wherein the first material volume includes a bone volume, wherein the bone volume includes voxels, of the plurality of voxels of the at least one provisional slice image, representing bone, wherein the second material volume includes voxels, of the plurality of voxels of the at least one provisional slice image, representing a material having a relatively greater absorption coefficient than bone.

4. The method of claim 3, wherein the determining of the first material volume and the determining of the second material volume include an application of a segmentation algorithm.

5. The method of claim 4, wherein each respective voxel of the plurality of voxels of the at least one provisional slice image includes a voxel value, wherein each respective voxel value is dependent on an absorption coefficient of a material represented in the respective voxel, and wherein the segmentation algorithm is based on a threshold value segmentation of the respective voxel value.

6. The method of claim 2, wherein the determining of the first material volume and the determining of the second material volume include an application of a segmentation algorithm.

7. The method of claim 6, wherein each respective voxel of a plurality of voxels of the at least one provisional slice image includes a voxel value, wherein each respective voxel value is dependent on an absorption coefficient of a material represented in the respective voxel, and wherein the segmentation algorithm is based on a threshold value segmentation of the respective voxel value.

8. The method of claim 3, wherein the at least one provisional slice image includes a plurality of voxels, wherein the first material volume includes a bone volume, wherein the bone volume includes voxels, of the plurality of voxels of the at least one provisional slice image, representing bone, wherein the second material volume includes voxels, of the plurality of voxels of the at least one provisional slice image, representing a material having a relatively greater absorption coefficient than bone.

9. The method of claim 2, wherein the determining of the reduced first material volume comprises:

determining at least one working projection image based on the first material volume and the second material volume, via the computing circuit, and deleting voxels from the first material volume whose projection in the at least one working projection image is overlaid with a projection of a voxel from the second material volume, via the computing circuit.

10. The method of claim 2, wherein each respective reduced projection image of the plurality of reduced projection images includes a plurality of pixels, wherein each respective pixel of the plurality of pixels includes a respective reduced pixel value, and wherein the determining of the plurality of reduced projection images includes:

multiplying each respective reduced pixel value by a weighting factor, via the computing circuit.

11. The method of claim 2, wherein the at least one slice image includes a plurality of voxels, wherein each respective voxel of the plurality of voxels includes a respective voxel value, and wherein the method further comprises:

multiplying each respective voxel value of the at least one slice image by an adjustment factor.

12. The method of claim 2, wherein the plurality of projection images is acquired via a cone-beam computed tomography system.

13. The method of claim 1, wherein the at least one slice image includes a plurality of voxels, wherein each respective voxel of the plurality of voxels includes a respective voxel value, and wherein the method further comprises:

multiplying each respective voxel value of the at least one slice image by an adjustment factor.

14. The method of claim 1, wherein the plurality of projection images is acquired via a cone-beam computed tomography system.

15. A reconstruction system for performing artifact correction during a reconstruction of at least one slice image from a plurality of projection images, the reconstruction system comprising:

an interface; and a computing circuit, at least one of the interface and the computing circuit being embodied to provide the plurality of projection images, each respective projection image of the plurality of projection images including a plurality of pixels and each respective pixel of the plurality of pixels including a respective pixel value, the computing circuit being further embodied to
determine a plurality of corrected projection images,
reconstruct the at least one slice image based on the plurality of corrected projection images, at least one of the interface and the computing circuit being embodied to provide the at least one slice image, wherein to determine the plurality of corrected projection images, the computing circuit is further embodied to, for each respective projection image of the plurality of projection images,
determine an average pixel value in at least one subarea of the respective projection image,
determine a respective correction value by multiplying the average pixel value by a scatter factor,
determine a plurality of corrected pixel values by
subtracting the respective correction value from the plurality of pixel values of the projection image, and
for each respective corrected pixel value
checking whether the respective corrected pixel value is below a minimum value, and
replacing the respective corrected pixel value by the minimum value in response to the corrected pixel value falling below the minimum value,
wherein a respective corrected projection image of the plurality of corrected projection images includes a plurality of pixels including the plurality of corrected pixel values.

16. A non-transitory computer-readable storage storing program sections, readable and executable by a reconstruction system, to perform a method for artifact correction during a reconstruction of at least one slice image from a plurality of projection images when the program sections are executed by the reconstruction system, the method comprising:

providing the plurality of projection images, each projection image of the plurality of projection images including a plurality of pixels and each pixel of the plurality of pixels including a pixel value;

determining a plurality of corrected projection images based on the plurality of projection images via a computing circuit;

reconstructing the at least one slice image based on the plurality of corrected projection images; and providing the at least one slice image, wherein the determining of the plurality of corrected projection images, for each respective projection image of the plurality of projection images, comprises:
determining an average pixel value in at least one subarea of the respective projection image,
determining a respective correction value by multiplying the average pixel value by a scatter factor, and
determining a plurality of corrected pixel values by
subtracting the respective correction value from the plurality of pixel values of the respective projection image, and
for each respective corrected pixel value
checking whether the respective corrected pixel value is below a minimum value, and
replacing the respective corrected pixel value by the minimum value in response to the corrected pixel value falling below the minimum value,
wherein a respective corrected projection image of the plurality of corrected projection images includes a plurality of pixels including the plurality of corrected pixel values.

* * * * *